US008563677B2

(12) United States Patent
Jenkins

(10) Patent No.: US 8,563,677 B2
(45) Date of Patent: Oct. 22, 2013

(54) NON-PRECIPITATING ALKALI/ALKALINE EARTH METAL AND ALUMINUM SOLUTIONS MADE WITH DIOLS HAVING AT LEAST TWO PRIMARY HYDROXYL GROUPS

(75) Inventor: Jason Christopher Jenkins, Kingsport, TN (US)

(73) Assignee: Grupo Petrotemex, S.A. de C.V., San Pedro Garza Garcia (MX)

( * ) Notice: Subject to any disclaimer, the term of this patent is extended or adjusted under 35 U.S.C. 154(b) by 957 days.

(21) Appl. No.: 11/711,345

(22) Filed: Feb. 27, 2007

(65) Prior Publication Data

US 2008/0139727 A1 Jun. 12, 2008

Related U.S. Application Data

(60) Provisional application No. 60/873,785, filed on Dec. 8, 2006.

(51) Int. Cl.
*C08G 63/00* (2006.01)

(52) U.S. Cl.
USPC ........... 528/275; 528/272; 528/276; 528/286; 528/308.1; 528/308.3; 502/102; 502/104; 502/111; 502/132; 502/172

(58) Field of Classification Search
USPC .................. 502/102, 111, 104, 132, 172; 528/271–276, 286, 308.1, 308.3; 524/400, 441
See application file for complete search history.

(56) References Cited

U.S. PATENT DOCUMENTS

| 2,965,613 | A | 12/1960 | Milone et al. |
|---|---|---|---|
| 3,264,255 | A | 8/1966 | Taylor |
| 3,420,913 | A | 1/1969 | Railsback |
| 3,733,309 | A | 5/1973 | Wyeth et al. |
| 3,852,262 | A | 12/1974 | Vit et al. |
| 3,959,390 | A | 5/1976 | Vanlerberghe |
| 4,087,482 | A | 5/1978 | Shaffer |
| 4,093,593 | A | 6/1978 | Go |
| 4,133,794 | A | 1/1979 | Lamb |
| 4,159,301 | A | 6/1979 | Buser et al. |
| 4,161,571 | A | 7/1979 | Yasui et al. |
| 4,185,043 | A | 1/1980 | Shaffer |
| 4,207,134 | A | 6/1980 | Valyi |
| 4,228,549 | A | 10/1980 | Rispoli |
| 4,230,595 | A | 10/1980 | Yamaji et al. |
| 4,250,078 | A | 2/1981 | McFarlane et al. |
| 4,330,661 | A | 5/1982 | Go |
| 4,343,922 | A | 8/1982 | Shaffer |
| 4,355,154 | A | 10/1982 | Saam et al. |
| 4,357,461 | A | 11/1982 | Go et al. |
| 4,408,004 | A | 10/1983 | Pengilly |
| 4,420,581 | A | 12/1983 | McFarlane et al. |
| 4,424,337 | A | 1/1984 | Smith et al. |
| 4,447,595 | A | 5/1984 | Smith et al. |
| 4,476,272 | A | 10/1984 | Pengilly |
| 4,481,314 | A | 11/1984 | Rule |
| 4,499,288 | A | 2/1985 | Harris |
| 4,520,078 | A | 5/1985 | Rabinowitz et al. |
| 4,535,118 | A | 8/1985 | Pengilly |
| 4,551,368 | A | 11/1985 | Smith et al. |
| 4,604,303 | A | 8/1986 | Takakura et al. |
| 4,617,374 | A | 10/1986 | Pruett et al. |
| 4,702,963 | A | 10/1987 | Phillips et al. |
| 4,704,417 | A | 11/1987 | Bonin et al. |
| 4,740,377 | A | 4/1988 | Dawes et al. |
| 4,764,323 | A | 8/1988 | Al Ghatta |
| 4,831,115 | A | 5/1989 | Golba, Jr. et al. |
| 5,049,647 | A | 9/1991 | Al-Ghatta |
| 5,090,134 | A | 2/1992 | Russemeyer et al. |
| 5,104,965 | A | 4/1992 | Jenkins et al. |
| 5,114,570 | A | 5/1992 | Nelson et al. |
| 5,220,140 | A | 6/1993 | Ball et al. |
| 5,250,333 | A | 10/1993 | McNeely et al. |
| 5,258,233 | A | 11/1993 | Mills et al. |

(Continued)

FOREIGN PATENT DOCUMENTS

| CN | 1392174 | 1/2003 |
|---|---|---|
| CN | 1482154 | 3/2004 |

(Continued)

OTHER PUBLICATIONS

Plastic Additives Handbook 5th Ed., 2001, pp. 123-136, Hanser Gardner Publications.

(Continued)

*Primary Examiner* — Frances Tischler
(74) *Attorney, Agent, or Firm* — Oblon, Spivak, McClelland, Maier & Neustadt, L.L.P.

(57) ABSTRACT

A stable catalyst solution suitable for catalyzing the polycondensation of reactants to make polyester polymers comprising:

(i) M, wherein M is represented by an alkaline earth metal or alkali metal and (ii) aluminum metal and (iii) a polyhydroxyl solvent having at least 3 carbon atoms and at least two primary hydroxyl groups, the longest carbon chain being a hydrocarbon; such as 1,3-propane diol, 1,4-butane diol, 1,5-pentane diol, or combinations thereof, wherein the molar ratio of M:Al ranges from 0.75:1 to less than 1.5:1. The catalyst solution is desirably a solution which does not precipitate upon standing over a period of at least one week at room temperature (25° C.-40° C.), even at molar ratios of M:Al approaching 1:1. There is also provided a method for the manufacture of the solution, its feed to and use in the manufacture of a polyester polymer, and polyester polymers obtained by combining certain ingredients or containing the residues of these ingredients in the composition.

27 Claims, No Drawings

(56) References Cited

U.S. PATENT DOCUMENTS

| | | |
|---|---|---|
| 5,266,413 A | 11/1993 | Mills et al. |
| 5,300,746 A | 4/1994 | Walters et al. |
| 5,310,977 A | 5/1994 | Stenkamp et al. |
| 5,318,797 A | 6/1994 | Matijevic et al. |
| 5,340,884 A | 8/1994 | Mills et al. |
| 5,367,070 A | 11/1994 | Nath et al. |
| 5,372,864 A | 12/1994 | Weaver et al. |
| 5,382,157 A | 1/1995 | Denis et al. |
| 5,384,337 A | 1/1995 | Budinger |
| 5,384,377 A | 1/1995 | Weaver et al. |
| 5,393,871 A | 2/1995 | Yau et al. |
| 5,409,983 A | 4/1995 | Jones et al. |
| 5,410,984 A | 5/1995 | Pikus et al. |
| 5,419,936 A | 5/1995 | Tindale |
| 5,514,462 A | 5/1996 | Endo et al. |
| 5,529,744 A | 6/1996 | Tindale |
| 5,593,740 A | 1/1997 | Strumban et al. |
| 5,646,208 A | 7/1997 | Cattron et al. |
| 5,656,221 A | 8/1997 | Schumann et al. |
| 5,656,716 A | 8/1997 | Schmidt et al. |
| 5,674,801 A | 10/1997 | George |
| 5,688,874 A | 11/1997 | Hoffman |
| 5,774,571 A | 6/1998 | Marshall |
| 5,830,544 A | 11/1998 | Kerscher et al. |
| 5,851,668 A | 12/1998 | Sandor et al. |
| 5,898,058 A | 4/1999 | Nichols et al. |
| 5,906,882 A | 5/1999 | Valente et al. |
| 5,925,710 A | 7/1999 | Wu et al. |
| 5,940,022 A | 8/1999 | Takatsu |
| 5,976,450 A | 11/1999 | Mreijen |
| 5,998,004 A | 12/1999 | Nishino et al. |
| 6,020,419 A | 2/2000 | Bock et al. |
| 6,022,920 A | 2/2000 | Maxwell et al. |
| 6,031,128 A | 2/2000 | Roh et al. |
| 6,066,714 A | 5/2000 | Putzig et al. |
| 6,150,454 A | 11/2000 | Wu et al. |
| 6,156,867 A | 12/2000 | Aoyama et al. |
| 6,160,085 A | 12/2000 | Fujimori et al. |
| 6,165,601 A | 12/2000 | Noda et al. |
| 6,166,170 A | 12/2000 | Putzig |
| 6,197,851 B1 | 3/2001 | Maxwell et al. |
| 6,200,659 B1 | 3/2001 | Fujimori et al. |
| 6,214,915 B1 | 4/2001 | Avakian et al. |
| 6,261,656 B1 | 7/2001 | Semersky |
| 6,274,212 B1 | 8/2001 | Rule et al. |
| 6,274,852 B1 | 8/2001 | Blok et al. |
| 6,277,947 B1 | 8/2001 | Kelsey et al. |
| 6,281,278 B1 | 8/2001 | Takase et al. |
| 6,300,399 B1 | 10/2001 | Gallucci et al. |
| 6,313,200 B1 | 11/2001 | Finder |
| 6,316,584 B1 | 11/2001 | Seidel et al. |
| 6,323,271 B1 | 11/2001 | Caldwell et al. |
| 6,358,578 B1 | 3/2002 | Otto et al. |
| 6,365,659 B1 | 4/2002 | Aoyama et al. |
| 6,372,929 B1 | 4/2002 | Ridland et al. |
| 6,427,826 B1 | 8/2002 | Li et al. |
| 6,428,882 B1 | 8/2002 | Peiffer et al. |
| 6,451,959 B1 | 9/2002 | Ohmatsuzawa et al. |
| 6,458,915 B1 | 10/2002 | Quillen |
| 6,465,098 B2 | 10/2002 | Mizuguchi et al. |
| 6,472,471 B2 | 10/2002 | Cooke et al. |
| 6,473,024 B2 | 10/2002 | Toyoda et al. |
| 6,498,212 B1 | 12/2002 | Kao et al. |
| 6,500,890 B2 | 12/2002 | Edwards et al. |
| 6,500,915 B1 | 12/2002 | Fujimori et al. |
| 6,503,586 B1 | 1/2003 | Wu et al. |
| 6,506,853 B2 | 1/2003 | Duan |
| 6,559,271 B2 | 5/2003 | Schaaf et al. |
| 6,569,991 B2 | 5/2003 | Nichols et al. |
| 6,572,810 B2 | 6/2003 | Chatterjee et al. |
| 6,573,359 B2 | 6/2003 | Nichols et al. |
| 6,590,069 B2 | 7/2003 | Nichols et al. |
| 6,599,596 B2 | 7/2003 | Nichols et al. |
| 6,601,987 B2 | 8/2003 | Finder et al. |
| 6,649,731 B2 | 11/2003 | Hori et al. |
| 6,660,792 B2 | 12/2003 | Massey et al. |
| 6,710,158 B2 | 3/2004 | Edwards et al. |
| 6,716,904 B2 | 4/2004 | Takahashi |
| 6,727,306 B2 | 4/2004 | Edwards et al. |
| 6,773,800 B2 | 8/2004 | Hosoe et al. |
| 6,777,048 B2 | 8/2004 | Quillen |
| 6,780,916 B2 | 8/2004 | Tung et al. |
| 6,797,401 B2 | 9/2004 | Herron |
| 6,803,082 B2 | 10/2004 | Nichols et al. |
| 6,827,897 B2 | 12/2004 | Hall et al. |
| 6,828,272 B2 | 12/2004 | Wiegner et al. |
| 6,896,830 B2 | 5/2005 | Carlton et al. |
| 6,953,768 B2 | 10/2005 | Wallace et al. |
| 7,300,967 B2 | 11/2007 | Xia |
| 7,332,204 B2 | 2/2008 | Hutchinson et al. |
| 2002/0011694 A1 | 1/2002 | Nichols et al. |
| 2002/0032300 A1 | 3/2002 | Dowling et al. |
| 2002/0087845 A1 | 7/2002 | Dowling et al. |
| 2002/0094402 A1 | 7/2002 | Jen |
| 2002/0128427 A1 | 9/2002 | Schaaf et al. |
| 2002/0136808 A1 | 9/2002 | Rule |
| 2002/0137872 A1 | 9/2002 | Schneider et al. |
| 2002/0137879 A1 | 9/2002 | Ohmatsuzawa et al. |
| 2002/0193555 A1 | 12/2002 | Hori et al. |
| 2002/0198297 A1 | 12/2002 | Odorisio et al. |
| 2003/0018160 A1 | 1/2003 | Otto et al. |
| 2003/0040564 A1 | 2/2003 | Tung et al. |
| 2003/0045673 A1 | 3/2003 | Nakajima et al. |
| 2003/0083191 A1 | 5/2003 | Nakajima et al. |
| 2003/0108702 A1 | 6/2003 | Tung et al. |
| 2003/0144459 A1 | 7/2003 | Fujimori et al. |
| 2003/0216253 A1 | 11/2003 | Wiegner et al. |
| 2004/0023000 A1 | 2/2004 | Young et al. |
| 2004/0058805 A1 | 3/2004 | Nakajima et al. |
| 2004/0086733 A1 | 5/2004 | Fujimori et al. |
| 2004/0096609 A1 | 5/2004 | Nichols et al. |
| 2004/0101642 A1 | 5/2004 | Quillen et al. |
| 2004/0102316 A1 | 5/2004 | Wallace et al. |
| 2004/0106767 A1 | 6/2004 | Simon et al. |
| 2004/0178386 A1 | 9/2004 | Tung et al. |
| 2004/0180159 A1 | 9/2004 | Neal et al. |
| 2004/0180996 A1 | 9/2004 | Pearson et al. |
| 2004/0180997 A1 | 9/2004 | Pearson et al. |
| 2004/0185198 A1 | 9/2004 | Sisson et al. |
| 2004/0192813 A1 | 9/2004 | Pearson et al. |
| 2004/0224842 A1 | 11/2004 | Wallace et al. |
| 2004/0225104 A1 | 11/2004 | Wiegner et al. |
| 2004/0235640 A1 | 11/2004 | Sterzel |
| 2004/0236066 A1 | 11/2004 | Moore et al. |
| 2004/0249113 A1 | 12/2004 | Quillen et al. |
| 2005/0107576 A1 | 5/2005 | Hori et al. |
| 2005/0153086 A1 | 7/2005 | Moore et al. |
| 2005/0187374 A1 | 8/2005 | Chen et al. |
| 2005/0203267 A1 | 9/2005 | Jernigan et al. |
| 2005/0222345 A1 | 10/2005 | Nakayama et al. |
| 2006/0155102 A1* | 7/2006 | Lindall et al. .......... 528/277 |
| 2006/0222795 A1 | 10/2006 | Howell et al. |
| 2006/0223958 A1 | 10/2006 | Fischbuch |
| 2006/0287471 A1 | 12/2006 | Schreiber et al. |
| 2006/0287472 A1 | 12/2006 | Jernigan |
| 2007/0066735 A1 | 3/2007 | Quillen et al. |
| 2007/0066791 A1 | 3/2007 | Jernigan et al. |
| 2007/0106055 A1 | 5/2007 | Kageyama et al. |
| 2007/0123612 A1 | 5/2007 | Bastioli et al. |

FOREIGN PATENT DOCUMENTS

| | | |
|---|---|---|
| EP | 0581246 | 2/1994 |
| EP | 0541702 | 9/1996 |
| EP | 0465040 | 1/1997 |
| EP | 0884365 | 12/1998 |
| EP | 0921144 | 6/1999 |
| EP | 1152035 | 11/2001 |
| EP | 1477506 | 11/2004 |
| EP | 1 227 117 | 12/2004 |
| EP | 1227117 | 12/2004 |
| EP | 1516892 | 3/2005 |
| EP | 1535944 | 6/2005 |
| EP | 1548046 | 6/2005 |

(56) References Cited

FOREIGN PATENT DOCUMENTS

| | | |
|---|---|---|
| EP | 1239006 | 7/2005 |
| EP | 1 854 820 | 11/2007 |
| GB | 673066 | 6/1952 |
| JP | 46-35500 | 10/1971 |
| JP | 46040711 | 12/1971 |
| JP | 46040713 | 12/1971 |
| JP | 46040714 | 12/1971 |
| JP | 46041025 | 12/1971 |
| JP | 46041031 | 12/1971 |
| JP | 48044959 | 12/1973 |
| JP | 49057092 | 6/1974 |
| JP | 52-039790 | 3/1977 |
| JP | 56-149423 | 11/1981 |
| JP | 59-015427 | 1/1984 |
| JP | 60-151826 | 8/1985 |
| JP | 61-278558 | 12/1986 |
| JP | 61-291650 | 12/1986 |
| JP | 62-039208 | 2/1987 |
| JP | 62-177035 | 8/1987 |
| JP | 63-315604 | 12/1988 |
| JP | 62-182065 | 1/1989 |
| JP | 22-14734 | 8/1990 |
| JP | 5-287067 | 11/1993 |
| JP | 06-184333 | 7/1994 |
| JP | 62-79599 | 10/1994 |
| JP | 09-256220 | 9/1997 |
| JP | 1999071106 | 3/1999 |
| JP | 11-181067 | 7/1999 |
| JP | 1999236440 | 8/1999 |
| JP | 2000302854 | 10/2000 |
| JP | 200126639 | 1/2001 |
| JP | 2001 106693 | 4/2001 |
| JP | 2001262016 | 9/2001 |
| JP | 2002322258 | 11/2002 |
| JP | 2003040992 | 2/2003 |
| JP | 2003113230 | 4/2003 |
| JP | 2003113232 | 4/2003 |
| JP | 2003171455 | 6/2003 |
| JP | 2003268093 | 9/2003 |
| JP | 2003301038 | 10/2003 |
| JP | 2003306538 | 10/2003 |
| JP | 2003306601 | 10/2003 |
| JP | 2004035659 | 2/2004 |
| JP | 2004035660 | 2/2004 |
| JP | 2004067733 | 3/2004 |
| JP | 2004156055 | 6/2004 |
| JP | 2004197088 | 7/2004 |
| JP | 2004204138 | 7/2004 |
| JP | 2004224858 | 8/2004 |
| JP | 2004256633 | 9/2004 |
| JP | 2004323627 | 11/2004 |
| JP | 2005023160 | 1/2005 |
| JP | 2005047960 | 2/2005 |
| JP | 2005047961 | 2/2005 |
| JP | 2005047962 | 2/2005 |
| JP | 2005187556 | 7/2005 |
| JP | 2005187557 | 7/2005 |
| JP | 2005187558 | 7/2005 |
| JP | 2005187559 | 7/2005 |
| JP | 2005187560 | 7/2005 |
| JP | 2005187561 | 7/2005 |
| JP | 2005220234 | 8/2005 |
| JP | 2005213291 | 11/2005 |
| JP | 2005213292 | 11/2005 |
| JP | 2005213293 | 11/2005 |
| JP | 2006 282937 | 9/2006 |
| WO | WO 97/44376 | 11/1997 |
| WO | WO 99/57173 | 11/1999 |
| WO | WO 01/21680 | 3/2001 |
| WO | WO 01/46306 | 6/2001 |
| WO | WO 01/47688 | 7/2001 |
| WO | WO 02/18472 | 3/2002 |
| WO | WO 02/051616 | 7/2002 |
| WO | WO 02/068497 | 9/2002 |
| WO | WO 02/072665 | 9/2002 |
| WO | WO 2004/065452 | 8/2004 |
| WO | WO 2004/074365 | 9/2004 |
| WO | WO 2004/078825 | 9/2004 |
| WO | WO 2004/101645 | 11/2004 |
| WO | WO 2005/068531 | 7/2005 |
| WO | WO 2005/075539 | 8/2005 |
| WO | WO 2005/082527 | 9/2005 |
| WO | WO 2005/095516 | 10/2005 |
| WO | WO 2006 095901 | 10/2006 |

OTHER PUBLICATIONS

Fred W. Billmeyer, Jr., Methods for Estimating Intrinsic Vicosity, Journal of Polymer Science, 4, 1949, pp. 83-86, E.I. du Pont de Nemours and Co., Arlington, New Jersey.

Carl W. Fuller, Colored Iron Oxide Pigments, Synthetic Pigment Handbook, 1973, pp. 323-349, vol. 1, John Wiley and Sons, New York.

Fred W. Billmeyer, Jr., Principles of Color Technology, Describing Color, 1981, pp. 25-66, John Wiley and Sons, New York.

Kirk Othmer, Titanium and Titanium Alloys, Encyclopedia of Chemical Technology, vol. 24, $4^{th}$ Ed., 1997, pp. 186-224; 225-349 and 801.

Louis E. Toth, Transition Metal Carbide and Nitrides, General Properties, Preparation and Characterization, 1971, p. 1-28, Academic Press New York.

Kirk Othmer, Encyclopedia of Chemical Technology, vol. 17, $4^{th}$ Ed., 1996, pp. 108-127.

Kirk Othmer, Encyclopedia of Chemical Technology, vol. 4, $4^{th}$ Ed., 1992, pp. 841-848.

Kirk Othmer, Encyclopedia of Chemical Technology, vol. 4, $4^{th}$ Ed., 1997, pp. 423-430.

Kirk Othmer, Encyclopedia of Chemical Technology, vol. 25, $4^{th}$ Ed., 1998, pp. 872-873.

Kirk Othmer, Encyclopedia of Chemical Technology, vol. 23, $4^{th}$ Ed., 1997, p. 676.

Kirk Othmer, Encyclopedia of Chemical Technology, vol. 6, $4^{th}$ Ed., 1998, pp. 228-311.

Kirk Othmer, Encyclopedia of Chemical Technology, vol. 24, $4^{th}$ Ed., 1998, pp. 572-602.

Kirk Othmer, Encyclopedia of Chemical Technology, vol. 14., $4^{th}$ Ed., 1998, pp. 829-902.

Kirk Othmer, Encyclopedia of Chemical Technology, vol. 17, $4^{th}$ Ed., 1998, pp. 1-42; 43-67.

Kirk Othmer, Encyclopedia of Chemical Technology, vol. 12, $4^{th}$ Ed., 1998, pp. 863-881.

Kirk Othmer, Encyclopedia of Chemical Technology, vol. 22, $4^{th}$ Ed., 1997, pp. 256-278.

Kirk Othmer, Encyclopedia of Chemical Technology, vol. 16, $4^{th}$ Ed., pp. 925-962.

D.C. Allport and A.A. Mohajer, Block Copolymers, 1973, pp. 264-270, John Wiley and Sons, New York.

M.E. Stewart, A.J. Cox, D.M. Naylor, Reactive Processing of poly(ethylene 2,6-naphthalene dicarboxylate)/poly(ethylene terephthalate) Blends, Polymer, 1993, pp. 4060-4067, vol. 34, No. 19; Butterworth-Heinemann Ltd.

Liu et al., Improving Oxygen Barrier Properties of Poly(ethylene terephthalate) by incorporating isophthalate. I. Effect of Orientation, Journal of Applied Science, Nov. 15, 2005, 98(4), pp. 1615-1628, Wiley Periodicals, Inc.

Research Disclosure 39771; Anonymous; May 1997.

A. Boehm and A. Glaser, The quaterrylimides-highly efficient NIR absorbers for plastics, ANTEC paper 2004, Chicago, IL, May 2004.

Wu, S., A Generalized Criterion for Rubber Toughening: The Critical Matrix Ligament Thickness, Journal of Applied Polymer Science, vol. 35, pp. 549-561, 1988, John Wiley and Sons.

Weissmann, Mariana, et al.; "Theoretical study of cabon-coated iron nanowires"; Physical Review B70, 201401-1 through 201401-4; 2004; The American Physical Society.

Zhang, Z.D. et al.; "Shell/core structure and magnetic properties of carbon-coated Fe-Co© nanocapsules"; Journal of Physics: Condensed Matter 13; 1921-1929; 2001; Institute of Physics Publishing Ltd.

(56) References Cited

OTHER PUBLICATIONS

Pierson, H.O.; Handbook of Carbon, Graphite, Diamond and Fullerenes: Properties and Applications; pp. 122-140; Noyes Publications; 1993.
Co-pending U.S. Appl. No. 11/229,238, filed Sep. 16, 2005.
U.S. Appl. No. 60/718,286, filed Sep. 16, 2005, Now Expired.
Co-pending U.S. Appl. No. 11/495,431, filed Jul. 28, 2006.
U.S. Appl. No. 60/834,081, filed Jul. 28, 2006 Now Expired.
Co-pending U.S. Appl. No. 11/495,870, filed Mar. 7, 2007.
Co-pending U.S. Appl. No. 11/495,870, filed Jul. 28, 2006.
U.S. Appl. No. 60/834,116, filed Jul. 28, 2006 Now Expired.
Co-pending U.S. Appl. No. 11/511,719, filed Aug. 29, 2006.
USPTO U.S. Appl. No. 11/495,416, filed Jul. 28, 2006.
Office Action dated May 27, 2008 in copending U.S. Appl. No. 11/495,870.
Office Action dated Nov. 24, 2008 in copending U.S. Appl. No. 11/511,719.
Office Action dated Nov. 28, 2008 in copending U.S. Appl. No. 11/495,870.
Office Action dated Mar. 10, 2009 in copending U.S. Appl. No. 11/511,719.
Office Action dated Apr. 2, 2009 in copending U.S. Appl. No. 11/495,870.
Office Action dated Apr. 14, 2009 in copending U.S. Appl. No. 11/495,416.
Office Action dated Jun. 24, 2009 in copending U.S. Appl. No. 11/495,870.
Office Action dated Oct. 2, 2009 in copending U.S. Appl. No. 11/495,870.
Notification of Transmittal of the International Search Report and the Written Opinion of the International Searching Authority, or the Declaration date of mailing Dec. 28, 2007 for PCT/US2007/016092.
Notification of Transmittal of the International Search Report and the Written Opinion of the International Searching Authority, or the Declaration from PCT/US07/24080 date of mailing Jun. 9, 2008.
Notification of Transmittal of the International Search Report and the Written Opinion of the International Searching Authority, or the Declaration from PCT/US07/16103 date of mailing Jun. 6, 2008.
Notification of Transmittal of the International Search Report and the Written Opinion of the International Searching Authority, or the Declaration from PCT/US07/16003 date of mailing Dec. 19, 2007.
Notification of Transmittal of the International Search Report and the Written Opinion of the International Searching Authority, or the Declaration from PCT/US07/15649 date of mailing Feb. 25, 2008.
Office Action dated Oct. 21, 2009 in copending U.S. Appl. No. 11/495,416.
Office Action dated Jan. 19, 2010 in copending U.S. Appl. No. 11/495,416.
Notice of Allowance dated Dec. 28, 2009 in copending U.S. Appl. No. 11/495,870.
Office Action dated Sep. 18, 2009 in copending U.S. Appl. No. 11/511,719.
Notice of Allowance dated Feb. 19, 2010 in copending U.S. Appl. No. 11/511,719.
Office Action dated Jan. 15, 2009 in copending U.S. Appl. No. 11/714,924.
Office Action dated Jun. 3, 2009 in copending U.S. Appl. No. 11/714,942.
Notice of Allowance dated Dec. 15, 2009 in copending U.S. Appl. No. 11/714,942.
Office Action dated Dec. 18, 2008 in copending U.S. Appl. No. 11/229,238.
Office Action dated Jun. 23, 2009 in copending U.S. Appl. No. 11/229,238.
Office Action dated Jan. 26, 2010 in copending U.S. Appl. No. 11/229,238.
Office Action dated Jun. 9, 2008 in copending U.S. Appl. No. 11/495,431.
Office Action dated Dec. 15, 2008 in copending U.S. Appl. No. 11/495,431.
Office Action dated Jun. 4, 2009 in copending U.S. Appl. No. 11/495,431.
Office Action dated Dec. 30, 2009 in copending U.S. Appl. No. 11/495,431.
Amini, M. Mohammadpour et al., "Sol-gel processing of .beta. eucryptite: an 27Al huclear magnetic resonance investigation in sol state," Materials Chemistry and Physics, vol. Date 2002, 78(1), pp. 81-87, 2003.
Francis, J. A. et al., "Sterically crowded aryloxides of aluminum: intramolecular coordination of bidentate ligands," Journal of Organometallic Chemistry, Elsevier-Sequoya S.A. Lausanne, CH, vol. 597, No. 1-2, Mar. 2000, pp. 29-37.
Shaviv, Materials Science and Engineering A., vol. 2009, Issues 1-2, pp. 345-352, 1996.

\* cited by examiner

NON-PRECIPITATING ALKALI/ALKALINE EARTH METAL AND ALUMINUM SOLUTIONS MADE WITH DIOLS HAVING AT LEAST TWO PRIMARY HYDROXYL GROUPS

This application claims priority to Provisional Application No. 60/873,785 filed Dec. 8, 2006, fully incorporated herein by reference.

1. FIELD OF THE INVENTION

The invention pertains to aluminum based solutions useful in the manufacture of polyester polymers, and more specifically to catalysts comprising aluminum and alkaline earth metal or alkali metals which have improved solubility at low alkaline earth metal or alkali metal:aluminum molar ratios.

2. BACKGROUND OF THE INVENTION

Catalyst solutions prepared from alkaline earth metal or alkali metals ("M") and aluminum tend to precipitate over time in ethylene glycol. This problem is especially noticeable as the molar ratio of M:Al in ethylene glycol drops from 5:1 and approaches 1:1, where precipitation begins to occur at moderate temperatures less than 125° C. It is desirable that the feed of catalyst components to a melt phase polymerization process stay in solution as fed to provide more uniform mixing with the reactants or polymer melt, and to enable feeding a consistent and uniform amount of desired catalyst to the melt phase process.

A catalyst solution has advantages over catalyst slurries, in that a solution avoids the potential for pumping and circulation problems, avoids transfer line fouling and plugging, and avoids the need for vigorous agitation used in slurries to prevent insoluble catalyst precipitates from settling in feed tanks. Precipitates in the feed tanks make feeding a uniform feed of catalyst to the melt phase polymerization process a problem. The amount of actual catalyst fed to a melt phase polymerization line for making the polyester through a feed system set at a given flow rate will fluctuate if precipitates form, thereby leading to inconsistent product types or product quality.

Lithium hydroxide and aluminum isopropoxide can be combined in the presence of ethylene glycol to form a solution. This can be accomplished by heating the components to a temperature sufficient to form the catalyst in solution. The temperature for this reaction is normally in the range of 125° C. to 160° C. for one to five hours. Generally, the concentration of aluminum in the solution cannot exceed 3,000 ppm due to lack of solubility.

Precipitates can form under several conditions when a catalyst system is mixed in ethylene glycol. Precipitates can form when the catalyst solution cools down to ambient temperatures. To maintain the catalysts in solution, an ethylene glycol/Li/Al catalyst composition must remain at an elevated temperature of about 150° C. or more, especially when the molar ratio is about 3:1 or less and approaches 1:1. To maintain the catalyst solution at elevated temperatures requires increased plant capital for heated catalyst feed vessels.

Another way precipitates form is when the amount of aluminum in the catalyst composition exceeds 3000 ppm. It is desirable to employ a catalyst feed source having a high concentration of Al so that the amount of solvent fed to the melt phase process can be reduced. Dilute catalyst systems can be used but suffer the drawback that a higher volume of the solution is fed to the melt phase process to meet a target catalyst metal content, thereby requiring the removal through evaporation or reaction of larger amounts of solvent from the melt phase process.

Not only can the catalyst precipitate in ethylene glycol solutions when 3000 ppm aluminum or more is used or if the hot solution is allowed to cool, but it can precipitate as the molar ratio of M:Al approaches 1:1. However, we have discovered that a molar ratio of M:Al of about 1:1 is desirable in some applications because the yellowness of the polyester polymer is minimized as the molar ratio of M:Al approaches 1:1.

Thus, it would be desirable to provide a catalyst composition which remains in solution at ambient conditions without agitation. Alternatively, or in addition, it would also be desirable if solutions can be made, if desired, at molar ratios of M:Al that approach 1:1 and are stable over a wide variety of temperatures, including ambient conditions. Alternatively, or in addition, it would be particularly advantageous if such solutions can be made using 3000 ppm Al or more to minimize the amount of solvent fed to a melt phase polycondensation process.

3. SUMMARY OF THE INVENTION

We have found that with the use of certain polyhydroxyl compounds, catalyst solutions can be prepared with improved solubility, which do not precipitate at ambient conditions over a period of at least one (1) week at low mole ratios of M:Al. Now there is provided a solution comprising:
(i) M, wherein M is represented by an alkaline earth metal or alkali metal and
(ii) aluminum metal and
(iii) a polyhydroxyl solvent having at least 3 carbon atoms and at least two primary hydroxyl groups, the longest carbon chain being a hydrocarbon;
wherein the molar ratio of M:Al ranges from 0.75:1 to less than 1.5:1

There is also provided a polyester polymer solution comprising the residue of this catalyst system and a polyester polymer, said catalyst system obtained by combining
(i) M, wherein M is represented by an alkaline earth metal or alkali metal and
(ii) aluminum metal and
(iii) a polyhydroxyl solvent having at least 3 carbon atoms and at least two primary hydroxyl groups, the longest carbon chain being a hydrocarbon;
wherein the molar ratio of M:Al ranges from 0.75:1 to less than 1.5:1

The solutions are useful to catalyze (increase the reaction rate) the formation of polyester polymers.

There is also provided another embodiment of a catalyst solution in which the amount of aluminum in the catalyst solution is greater than 3000 ppm which remains in solution over a period of at least one (1) week.

There is also provided a method for the manufacture of the solution, its feed to and use in the manufacture of a polyester polymer, and polyester polymers obtained with these catalyst solutions.

4. DETAILED DESCRIPTION OF THE INVENTION

The present invention may be understood more readily by reference to the following detailed description of the invention.

It must also be noted that, as used in the specification and the appended claims, the singular forms "a," "an" and "the"

include plural referents unless the context clearly dictates otherwise. For example, reference to processing or making a "polymer," a "preform," "article," "container," or "bottle" is intended to include the processing or making of a plurality of polymers, preforms, articles, containers or bottles.

References to a composition or solution containing "an" ingredient or "a" polymer is intended to include other ingredients or other polymers, respectively, in addition to the one named.

By "comprising" or "containing" or "having" is meant that at least the named compound, element, particle, or method step etc. must be present in the composition, solution or article or method, but does not exclude the presence of other compounds, catalysts, materials, particles, method steps, etc., even if the other such compounds, material, particles, method steps etc. have the same function as what is named, unless expressly excluded in the claims.

It is also to be understood that the mention of one or more method steps does not preclude the presence of additional method steps before or after the combined recited steps or intervening method steps between those steps expressly identified. Moreover, the lettering of process steps is a convenient means for identifying discrete activities or steps, and unless otherwise specified, recited process steps can be arranged in any sequence.

Expressing a range includes all integers and fractions thereof within the range. Expressing a temperature or a temperature range in a process, or of a reaction mixture, or of a melt or applied to a melt, or of a polymer or applied to a polymer means in all cases that the limitation is satisfied if either the applied temperature, the actual temperature of the melt or polymer, or both are at the specified temperature or within the specified range.

The word "composition" or "solution" means that each listed ingredient is present in the composition or solution, and does not imply that any ingredient in the composition or solution is unbound or unreacted. The composition may be solid or liquid. The stated ingredients in the composition may be bound, unbound, reacted, unreacted, and unless otherwise specified, in any oxidation state. For example, specifying the presence of "aluminum" or "Al" or "lithium" or "Li" means the atoms of aluminum or lithium, respectively, and does not imply that they occupy any oxidation state, any morphological state, any structural state, or any chemical state, whether as added to or as present in the solution, polymer or composition of matter, unless such states are expressly stated.

As used herein, the term "metal" is a metal atom and does not imply any oxidation state or its chemical state. Aluminum metal or an alkaline earth metal or alkali metal may be in any chemical state as a salt or chelate or complex or elemental, and in any oxidation state, unless otherwise expressly stated as having a particular oxidation state. The word "elemental," however, means a zero oxidation state.

The reported amount of a metal (e.g. ppm) is based on the amount of the metal atom present in the solution, polymer, or article and not the amount of the compound or salt, unless expressly stated as the amount of the compound or salt.

The intrinsic viscosity (It.V.) values are set forth in dL/g unit and calculated according to ASTM D 4603, whereby the inherent viscosity (Ih.V.) is measured at 30° C. in 60% phenol and 40% 1,1,2,2-tetrachloroethane by weight at a concentration of 0.5 g/dL.

The weight of alkaline earth metal or alkali can be measured or calculated upon addition to the melt phase or by analytical techniques for detecting the amount in the finished polymer or article. Suitable detection methods for the presence of alkali metals or alkaline earth metals include inductively coupled plasma optical emission spectroscopy (ICP-OES). The concentration of an alkaline earth metal or an alkali metal or aluminum or phosphorus or any other element or metal is reported as the parts per million of metal atoms based on the weight of the polymer.

There is now provided a solution comprising:
(i) M, wherein M is represented by an alkaline earth metal or alkali metal and
(ii) aluminum metal and
(iii) a polyhydroxyl solvent having at least 3 carbon atoms and at least two primary hydroxyl groups, the longest carbon chain being a hydrocarbon;
wherein the molar ratio of M:Al ranges from 0.75:1 to less than 1.5:1

The solution contains aluminum. The polyester polymers made with the solutions also contain aluminum. The presence of aluminum in the polyester polymer may be detected through any suitable analytical technique regardless of the oxidation state of the aluminum. Suitable detection methods for the presence of aluminum include inductively coupled plasma optical emission spectroscopy (ICP-OES). The concentration of aluminum is reported as the parts per million of metal atoms based on the weight of the polymer.

Reporting the concentration of aluminum or alkaline earth metal or alkali metals means the concentration of these atoms in the polymer, not the concentration of the metal compounds used to make the solution.

In the preparation of the solution, aluminum may be added as a compound (which includes a salt or a complex), or as an elemental metal provided that it is ultimately active as a catalyst in the polycondensation phase either alone or in combination with the alkali metal or alkaline earth metal atoms or compounds.

In one aspect of the invention, catalytic aluminum compounds with at least one organic substituent, or two, or three, are used in the preparation of the solution. Illustrative examples of aluminum compounds suitable as catalysts include those of the formula:

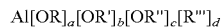

Al[OR]$_a$[OR']$_b$[OR"]$_c$[R"']$_d$ wherein R, R', R" are independently an alkyl group, aryl group, acyl group or hydrogen, R"' is an anionic group, and a, b, c, d are independently 0 or positive integers, and a+b+c+d is not greater than 3, or preferably equal to 3.

Aluminum compounds having catalytic activity include those which are capable of increasing the reaction rate of a polymerization reaction, in particular a condensation reaction such a those used to make polyester polymers (which can be measured as a reduction in residence time to reach a target It.V., or an increase in It.V. over time such as an increase of at least 0.1 dL/g over 1 hour). The particular aluminum compounds chosen are preferably those which are effective to increase the It.V. of the reaction melt by at least 0.2 dL/g within 1 hour.

The specific type of aluminum compounds employed are desirably those that are not readily soluble in ethylene glycol. The types of aluminum compounds that are not readily soluble will, when mixed with ethylene glycol at a concentration of 3000 ppm, precipitate at ambient conditions without agitation within 2 days. While other aluminum compounds that are readily soluble in ethylene glycol can be employed and are within the scope of the invention, they are often expensive or not commercially available. Thus, the invention provides the flexibility of providing solutions employing a wide selection of aluminum compounds, even those which are difficult to dissolve or are insoluble in ethylene glycol at ambient conditions. Suitable examples of aluminum compounds include the carboxylic acid salts of aluminum such as aluminum acetate, aluminum benzoate, aluminum lactate, aluminum laurate, aluminum stearate, aluminum alcoholates such as aluminum ethoxide, aluminum isopropoxide, aluminum phenoxide, aluminum sec-butoxide, aluminum tert-butoxide, aluminum tributoxide, and aluminum chelates in which the alkoxy group of an aluminum alcoholate is partially or wholly substituted by a chelating agents such as aluminum ethyl acetoacetate diisopropoxide, bis(2-butanolato)aluminum ethyl acetoacetate, aluminum acetylacetonate and aluminum tris(ethyl acetoacetate).

The effects of the invention are particularly noticeable among the difficult to dissolve or insoluble aluminum compounds in ethylene glycol. Examples of these compounds include the basic carboxylic acid salts of aluminum such as aluminum acetate, aluminum benzoate, aluminum laurate, aluminum stearate, and aluminum alcoholates such as aluminum ethoxide, aluminum isopropoxide, aluminum sec-butoxide, aluminum tert-butoxide, and aluminum tributoxide. In one aspect, the aluminum compound comprises aluminum acetate, and aluminum isoperoxide, and especially aluminum isopropoxide.

An amount of aluminum atoms, in combination with M, are employed to effect polycondensation once added to the melt phase polymerization process. Suitable amounts of aluminum atoms present in the polymer generally range from at least 3 ppm, or at least 5 ppm, or at least 10 ppm, or at least 15 ppm, or at least 20 ppm, or at least 30 ppm, and up to about 150 ppm, or up to about 100 ppm, or up to about 75 ppm, or up to about 60 ppm, or up to 30 ppm, or up to 20 ppm, or up to 15 ppm aluminum atoms based on the weight of the polymer. The preferred range of aluminum loading in the polyester polymer is, and the amount of aluminum atoms present in the solution fed to a melt phase polymerization reactor is effective to provide in the polymer, 5 ppm to 60 ppm, with the most preferred amount on a calculated basis ranging from 10 to 20 ppm Al based on the weight of the polymer.

Of course, the solution may and usually will contain a much higher concentration of the metals than present in the polyester polymer. The solution is fed or metered to the melt phase at a rate corresponding to the desired amount of metal present in the polyester polymer. The solution may contain any desired amount of aluminum, but generally from 1000 ppm, or at least 2000 ppm, or greater than 3000 ppm, or at least 3500 ppm, or at least 4000 ppm, or at least 5000 ppm, or at least 1 wt. % of Al or even up to 3 wt %. The maximum amount of aluminum used is up to its solubility limit in a given solvent mix at ambient conditions. High concentrations of aluminum are desirable so that the amount of solvent fed to the melt phase process is reduced and/or higher loadings of aluminum can be fed to the melt phase process for making the polyester polymer at a given flow rate in order to increase the polycondensation reaction rate and thereby lower the polymerization time and increase throughput.

In one embodiment, there is provided a catalyst solution containing at least 3000 ppm aluminum, or at least 3500 ppm aluminum, or at least 4000 ppm aluminum, or at least 10,000 ppm, and may contain up to 10 wt. % or up to 5 wt. % or up to 3 wt. % or up to 2 wt. % aluminum.

The alkali may be added as a metal compound or an organometallic compound. The alkali metals and alkaline earth metals include the metals in Group IA and Group IIA of the periodic table, including but not limited to Li, Na, K, Rb, Cs, Mg, Ca, Sr, and preferably Li, Na or K. If rapid rates are the primary concern, Li or Na are generally preferred. The metals may be added to the melt phase as metal compounds (which includes a complex or a salt) having counterions, among which the preferred ones are hydroxides, carbonates, and carboxylic acids.

The amount of alkaline earth metal or alkali, in combination with Al, is effective to increase the molecular weight of the polymer melt. The amount by weight will vary widely depending upon the molecular weight of the metal. The amount of the alkaline earth metal or alkali metal in the solution may vary between at least 100 ppm, or at least 150 ppm, or at least 250 ppm, or at least 500 ppm, or at least 700 ppm, or at least 780 ppm, or at least 1000 ppm, or at least 2000 ppm, or at least 2460 ppm, or at least 3000 ppm, or at least 5000 ppm, or at least 1 wt. %, or at least 2 wt. %, and up to about 30 wt. %, or up to about 20 wt. %, or up to 15 wt. %, or up to 10 wt. %, or up to 5 wt. %, or up to 2 wt. %, or up to 1 wt. %, or up to 5000 ppm, based on the weight of the solution.

The amount of alkaline earth metal or alkali metal fed to the melt phase polymerization process is effective to produce a polyester polymer composition containing, and the polyester polymer composition contains, from at least 1 ppm, or at least 2 ppm, or at least 3 ppm, or at least 4 ppm, or at least 5 ppm, and up to about 60 ppm, or up to about 50 ppm, or up to about 30 ppm, or up to about 20 ppm, or up to about 15 ppm, alkaline earth metal or alkali metal on a calculated basis and based on the weight of the polyester polymer composition.

The molar ratio of the alkaline earth metal or alkali:aluminum (M:Al) is desirably at least 0.75:1, or at least 0.5:1, or at least 0.8:1, or at least 0.85:1, or at least 0.9:1, or a least 0.95:1, and up to less than 1.5:1, or up to 1.4:1, or up to 1.3:1, or up to 1.25:1, or up to 1.2:1, or up to 1.15:1, or up to 1.1:1, or up to 1.05:1. More examples of suitable ranges include 0.75:1 to 1.25:1, or 0.8:1 to 1.25:1, or 0.9:1 to 1.1:1, or about 1:1.

It is desirable to provide a large number of Al atoms to increase the catalytic activity of the catalyst system. Although not wishing to be bound to a theory, it is believed that aluminum is difficult to dissolve in ethylene glycol. Ethylene glycol has been a common carrier for a wide variety of solutions and/or dispersions since it is generally a reactant in the polymerization process for making a polyester polymer or is highly compatible with the melt. It is now possible, however, using the solvents described in the invention, to provide a solution which has a lower tendency to precipitate even at higher levels of aluminum and/or at low temperatures and/or at molar ratios of M:Al approaching 1:1.

Stable solutions having molar ratios of M:Al approaching 1:1 are obtainable using the solvent described below, whereas stable solutions employing molar ratios of M:Al approaching 1:1 in ethylene glycol as the sole solvent are not obtainable. In this embodiment, a stable solution that does not precipitate over a period of at least one (1) week at ambient conditions is obtainable at molar ratios of M:Al within a range of 0.75:1 to 1.5:1, or 0.9:1 to 1.25:1, or 0.9:1 to 1.1:1. We have found that solutions of ethylene glycol tend to be more stable as the molar ratio of M:Al increases to 3:1 and beyond, but at molar ratios approaching 1:1, precipitates readily form upon cooling the solution to ambient conditions. By contrast, the addition of the polyhydroxyl solvents described herein improves the solubility and stability of catalysts having a low molar ratio.

Not only are solutions prepared with polyhydroxyl solvents stable at ambient conditions over a period of one (1) week at molar ratios of M:Al approaching 1:1, (and by contrast ethylene glycol solutions are not stable at these low mole ratios at ambient conditions), but these polyhydroxyl solvents appear to be lose their effectiveness as the molar ratio increases to 2:1 and beyond, while by contrast, ethylene glycol appears to be more effective at the higher molar ratios especially 5:1.

The polyhydroxyl solvent employed in the invention keeps the alkaline earth metal or alkali metal and aluminum metal combinations in solution over a period of at least one (1) week at ambient conditions. Ambient conditions means a temperature between 25° C. and 40° C. and a pressure of about 1 atmosphere without agitation). A composition is deemed a "solution" when, if measured, no precipitates are visible by visual inspection to the naked eye after allowing the composition to stand still over a period of at least one (1) week at ambient conditions In another embodiment, the solubility of (i) and (ii) in the solvent at the given concentrations in a particular composition is sufficiently high such that, if measured, no precipitation is visible to the naked eye when the solution is allowed to stand still over a period of period of at least two (2) weeks, or at least three (3) weeks, or at least four (4) weeks.

The solvent compound employed to maintain the catalyst system in solution is a polyhydroxyl solvent. The polyhydroxyl solvent has at least two (2) primary hydroxyl groups. The polyhydroxyl solvent has at least three (3) carbon atoms including the carbons bonded to the hydroxyl groups. The longest carbon chain of the polyhydroxyl compound is a hydrocarbon, e.g, repeating consecutive carbons throughout the longest carbon chain with each carbon having at least 1 hydrogen atom. As such, the hydrocarbon chain does not contain ether or ester or amide linkages. However, the longest carbon chain in the polyhydroxyl solvent may be branched or unbranched, saturated or unsaturated, substituted or unsubstituted internal to the primary hydroxyl group carbon atoms The solvent compound desirably has no more than two (2) hydroxyl groups.

The solvent compound is desirably unbranched.

The solvent compound is desirably linear.

The solvent compound desirably has no more than 8 carbon atoms, or no more than 6 carbon atoms, or no more than 5 carbon atoms.

The solvent compound is desirably saturated, e.g. no unsaturation.

The two primary hydroxyl groups on the solvent compound are desirably end groups.

The solvent compound desirably has no functional group other than the at least two primary hydroxyl groups, and more preferably only two primary hydroxyl groups.

The amount of polyhydroxyl solvent is sufficient to keep the aluminum and alkaline earth metal or alkali metals in solution. The polyhydroxyl solvent may be the sole solvent or may be combined with other diluents, solvents, or liquid carriers so long as the catalyst stays in solution for a period of at least one (1) week. The amount of polyhydroxyl solvent present in the solution, based on the weight of the solution, is preferably sufficient to obtain a stable solution (no precipitation) after one week at ambient conditions (between 25° C.-40° C. and about 1 atmosphere). The amount of polyhydroxyl solvent can vary widely depending on the nature of other solvents used. Suitable amounts generally range from at least 30 wt. %, or from 35 wt. %, or from 40 wt. %, or from 45 wt. %, or from 50 wt. %, or from 60 wt. %, or from 70 wt. %, or from 75 wt. %, or from 80 wt. %, or from 90 wt. %, or from 95 wt. %, and up to 100%, based on the weight of all liquids in the solution. When mixed with ethylene glycol, the amount of polyhydroxyl solvent is desirably at least 70 wt. %, or at least 75 wt. %, or at least 80 wt. %, or at least 90 wt. %, based on the weight of the solution Examples of the polyhydroxyl solvent include and are not limited to 1,3-propane diol, 1,4-butane diol, 1,5-pentane diol, or combinations thereof.

The solution is prepared by combining the alkaline earth metal or alkali salts with the aluminum compounds, preferably a trivalent aluminum compound, adding the polyhydroxyl solvent, and stirring the mixture at a temperature ranging from 20° C. to 150° C., or at 80° C. to 140° C.

In one embodiment, there is now also provided a process for making the solution comprising subjecting a composition containing M, Al, and the polyhydroxyl solvent to an inert gas sweep while heating, preferably to a temperature of at least 80° C. Such an inert gas sweep is desirable to avoid unwanted side reactions which may have the potential for discoloring the solution or inhibiting the solubility of the polyhydroxyl solvent. An example of a suitable inert gas sweep is a gas composition having a richer content of an inert gas than that found in the atmosphere, such as having a nitrogen concentration richer than that found in the atmosphere, typically containing at least 90% nitrogen. The volumetric flow rate is not particularly limited and can be easily adjusted to maintain the coloration of the solution within desired limits. Typical flow rates are at least 0.5 standard cubic feet per hour (SCFH), or at least 0.75 SCFH, or at least 1 SCFH, or at least 2 SCFH. Without being bound to a theory, it is believed that the inert gas sweep will promote the escape from the solution of volatile by-products that contribute to the formation of color bodies or which inhibit solubility. The inert gas is swept across a surface of the solution for at least a portion of the heating cycle during which the solution is made to become soluble. In another aspect, the solution is subjected to a gas sweep at least at the time when the solution obtains its highest temperature during preparation.

One or any combination of benefits and features are obtainable by the solutions of the invention:

A. Stable solutions which do not precipitate at ambient conditions over a period of at least one (1) week;

B. Solutions containing greater than 3000 ppm aluminum while satisfying A above; and C. Solutions which contain a molar ratio of M:Al approaching 1:1, such as ranging from 0.85:1 to 1.25:1, while satisfying A above; and There is also now provided a polyester polymer composition comprising a catalyst system and a polyester polymer, said catalyst system obtained by combining (i) M, wherein M is represented by an alkaline earth metal or alkali metal and (ii) aluminum metal and (iii) a polyhydroxyl solvent having at least three (3) carbon atoms and two (2) primary hydroxyl groups, wherein the molar ratio of M:Al ranges from 0.75:1 to less than 1.5:1.

The aluminum metal is typically combined with (i) and (iii) in the form of a salt or compound, as is M, as noted above.

The polyester polymer produced in the melt phase may contain phosphorus atoms. Phosphorus may be added late in the melt phase polymerization process to deactivate or stabilize the catalyst system, thereby reducing the haze level of the polymer, bottle preforms, and bottles made thereby, even at high catalyst loadings. The polyester polymer may contain phosphorus atoms in an amount ranging from 3 ppm to 500 ppm, based on the weight of the polymer composition. The amount of phosphorus is desirably at a mole ratio of P:M (all metals of aluminum and alkaline earth metals and alkali metals) within a range of 0.2:1 to 3:1. Typical amounts of phosphorus atoms will be at least 3 ppm, or at least 5 ppm, or at least 10 ppm, or at least 50 ppm, or at least 100 ppm, and up to 500 ppm, or up to 200 ppm, or up to 100 ppm, or up to 50 ppm, or up to 30 ppm, or up to 15 ppm. The solution haze values of these polymers can be as low as 30 ntu or less, or 20 ntu or less, or 15 ntu or less, or 10 ntu or less. The relative reduction of haze by addition of phosphorus is as large as 40% or more, or 50% or more, or 60% or more, relative to the same polymer made without phosphorus.

Other catalyst metals may be present if desired. For example, Mn, Zn, Sb, Co, Ti, and Ge catalysts may be used in conjunction with aluminum and alkaline earth metals or akali catalysts. Preferably, the polyester polymer is made without the addition of cobalt to the melt phase reaction since organic toners are preferred. Titanium catalysts can be used. The titanium catalysts are those compounds added in amounts which increase the It.V. of polyester melt by at least 0.3 dL/g if not deactivated. The amount of titanium catalyst, if used, generally ranges from 2 ppm to 15 ppm, or up to 10 ppm, based on the weight of the polymer. Antimony catalysts can also be used in combination with the catalyst system of the invention. The amount of antimony can range from 20 ppm to 250 ppm. Due to acetaldehyde (AA) generation concerns, the amount of antimony is preferred to be no greater than 125 ppm, based on the weight of the polymer, and preferably there is provided a polyester polymer which does not contain any antimony added to its manufacture in the melt phase.

In one embodiment, the polyester polymer contains aluminum, alkaline earth metal or alkali metals, and does not contain any antimony catalyst in catalytic quantities, or does not contain any cobalt catalyst in catalytic quantities, or does not contain any titanium catalyst in catalytic quantities, or does not contain any germanium catalyst in catalytic quantities, or does not contain any combination of Ti, Co, Sb, or Ge based catalysts in catalytic quantities, or does not contain any of the aforementioned catalyst metals (other than Al and alkaline earth metal or alkali metals) added to the polymer during its manufacture in the melt phase, or does not contain any catalyst metals other than aluminum and an alkaline earth metal or alkali. A catalyst metal is said to have catalytic activity if it increases the reaction rate or increases the It.V. of the melt by at least 0.1 dL/g from a starting point of 0.2 to 0.4 dL/g after 1 hour at 280° C. and 0.8 mm Hg. It is to be recognized, however, that one or more of metals such as cobalt or manganese will most likely be present at low levels in the melt because they come as impurities with the terephthalic acid composition made from a metal-catalyzed, liquid-phase oxidation process. Metal impurities present in the raw material supply to the melt phase process are not considered to be metals added to the melt phase process and they are not present in any event in catalytically effective quantities.

The "polyester polymer" is any thermoplastic polyester polymer. Polyester thermoplastic polymers of the invention are distinguishable from liquid crystal polymers and thermosetting polymers in that thermoplastic polymers have no appreciable ordered structure while in the liquid (melt) phase, they can be remelted and reshaped into a molded article, and liquid crystal polymers and thermosetting polymers are unsuitable for the intended applications such as packaging or stretching in a mold to make a container.

The polyester polymer is desirably a random polymer such that the monomer units in the polymer chain are randomly arranged rather than arranged in a block fashion. The polyester polymer contains repeating alkylene arylate units, such as alkylene terephthalate or alkylene naphthalate repeat units in the polymer chain. More specific examples of these repeating units include ethylene terephthalate, ethylene naphthalate, and trimethylene terephthalate.

More specific examples of polyester polymers comprise:
(i) a carboxylic acid component comprising at least 80 mole % of the residues of terephthalic acid, derivates of terephthalic acid, naphthalene-2,6-dicarboxylic acid, derivatives of naphthalene-2,6-dicarboxylic acid, or mixtures thereof, and
(ii) a hydroxyl component comprising at least 40 mole %, or at least 60 mole %, or at least 80 mole % of the residues of ethylene glycol or 1,3-propane diol, based on 100 mole percent of carboxylic acid component residues and 100 mole percent of hydroxyl component residues in the polyester polymer.

Typically, polyesters such as polyethylene terephthalate are made by reacting a diol such as ethylene glycol with a dicarboxylic acid as the free acid or its $C_1$-$C_4$ dialkyl ester to produce an ester monomer and/or oligomers, which are then polycondensed to produce the polyester. More than one compound containing carboxylic acid group(s) or derivative(s) thereof can be reacted during the process. All the compounds that enter the process containing carboxylic acid group(s) or derivative(s) thereof that become part of said polyester product comprise the "carboxylic acid component." The mole % of all the compounds containing carboxylic acid group(s) or derivative(s) thereof that are in the product add up to 100. The "residues" of compound(s) containing carboxylic acid group(s) or derivative(s) thereof that are in the said polyester product refers to the portion of said compound(s) which remains in the said polyester product after said compound(s) is condensed with a compound(s) containing hydroxyl group(s) and further polycondensed to form polyester polymer chains of varying length.

More than one compound containing hydroxyl group(s) or derivatives thereof can become part of the polyester polymer product(s). All the compounds that enter the process containing hydroxyl group(s) or derivatives thereof that become part of said polyester product(s) comprise the hydroxyl component. The mole % of all the compounds containing hydroxyl group(s) or derivatives thereof that become part of said polyester product(s) add up to 100. The "residues" of hydroxyl functional compound(s) or derivatives thereof that become part of said polyester product refers to the portion of said compound(s) which remains in said polyester product after said compound(s) is condensed with a compound(s) containing carboxylic acid group(s) or derivative(s) thereof and further polycondensed to form polyester polymer chains of varying length.

The mole % of the hydroxyl residues and carboxylic acid residues in the product(s) can be determined by proton NMR.

In another embodiment, the polyester polymer comprises:
(a) a carboxylic acid component comprising at least 90 mole %, or at least 92 mole %, or at least 96 mole % of the residues of terephthalic acid, derivates of terephthalic acid, naphthalene-2,6-dicarboxylic acid, derivatives of naphthalene-2,6-dicarboxylic acid, or mixtures thereof, more preferably terephthalic acid or derivates of terephthalic acid, and
(b) a hydroxyl component comprising at least 90 mole %, or at least 92 mole %, or at least 96 mole % of the residues of ethylene glycol or propane diol, more preferably ethylene glycol, based on 100 mole percent of the carboxylic acid component residues and 100 mole percent of the hydroxyl component residues in the polyester polymer.

The reaction of the carboxylic acid component with the hydroxyl component during the preparation of the polyester polymer is not restricted to the stated mole percentages since one may utilize a large excess of the hydroxyl component if desired, e.g. on the order of up to 200 mole % relative to the 100 mole % of carboxylic acid component used. The polyester polymer made by the reaction will, however, contain the stated amounts of aromatic dicarboxylic acid residues and ethylene glycol residues.

Derivates of terephthalic acid and naphthalane dicarboxylic acid include $C_1$-$C_4$ dialkylterephthalates and $C_1$-$C_4$ dialkylnaphthalates, such as dimethylterephthalate and dimethylnaphthalate.

Modifiers can be present in amount of up to 40 mole %, or up to 20 mole %, or up to 10 mole %, or up to 8 mole %, or up to 4 mole %, based on the total moles of their respective component in the polymer. Mono, tri and higher functional modifiers are preferably present in amounts of only up to about 8 mole %, or up to 4 mole %.

In addition to a diacid component of terephthalic acid, derivates of terephthalic acid, naphthalene-2,6-dicarboxylic acid, derivatives of naphthalene-2,6-dicarboxylic acid, or mixtures thereof, the carboxylic acid component(s) of the present polyester may include one or more additional modifier carboxylic acid compounds. Such additional modifier carboxylic acid compounds include mono-carboxylic acid compounds, dicarboxylic acid compounds, and compounds with a higher number of carboxylic acid groups. Examples include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. More specific examples of modifier dicarboxylic acids useful as an acid component(s) are phthalic acid, isophthalic acid, naphthalene-2,6-dicarboxylic acid, cyclohexane-1,4-dicarboxylic acid, cyclohexanediacetic acid, diphenyl-4,4'-dicarboxylic acid, succinic acid, glutaric acid, adipic acid, azelaic acid, sebacic acid, and the like, with isophthalic acid, naphthalene-2,6-dicarboxylic acid, and cyclohexane-1,4-dicarboxylic acid being most preferable. It should be understood that use of the corresponding acid anhydrides, esters, and acid chlorides of these acids is included in the term "carboxylic acid". It is also possible for tricarboxyl compound branching agents and compounds with a higher number of carboxylic acid groups to modify the polyester, along with monocarboxylic acid chain terminators.

In addition to a hydroxyl component comprising ethylene glycol, the hydroxyl component of the present polyester may include additional modifier polyhydroxyls, diols, or compounds with a higher number of hydroxyl groups. Examples of modifier hydroxyl compounds include cycloaliphatic diols preferably having 6 to 20 carbon atoms and/or aliphatic diols preferably having 3 to 20 carbon atoms. More specific examples of such diols include diethylene glycol; triethylene glycol; 1,4-cyclohexanedimethanol; propane-1,3-diol; butane-1,4-diol; pentane-1,5-diol; hexane-1,6-diol; 3-methylpentanediol-(2,4); 2-methylpentanediol-(1,4); 2,2,4-trimethylpentane-diol-(1,3); 2,5-ethylhexanediol-(1,3); 2,2-diethyl propane-diol-(1,3); hexanediol-(1,3); 1,4-di-(hydroxyethoxy)-benzene; 2,2-bis-(4-hydroxycyclohexyl)-propane; 2,4-dihydroxy-1,1,3,3-tetramethyl-cyclobutane; 2,2-bis-(3-hydroxyethoxyphenyl)-propane; and 2,2-bis-(4-hydroxypropoxyphenyl)-propane.

As modifiers, the polyester polymer may preferably contain such comonomers as isophthalic acid, naphthalane dicarboxylic acid, 1,4-cyclohexanedimethanol, and diethylene glycol.

The polyester composition may include blends of polyalkylene terephthalates and/or polyalkylene naphthalates along with other thermoplastic polymers such as polycarbonate (PC) and polyamides. It is preferred that the polyester composition should comprise a majority of the polyester polymers, more preferably in an amount of at least 80 wt. %, or at least 95 wt. %, and most preferably 100 wt. %, based on the weight of all thermoplastic polymers (excluding fillers, inorganic compounds or particles, fibers, impact modifiers, or other polymers which may form a discontinuous phase). It is also preferred that the polyester polymers do not contain any fillers, fibers, or impact modifiers or other polymers which form a discontinuous phase.

In one embodiment, the composition contains less than 60 wt %, or less than 40 wt %, or less than 20 wt. %, or less than 10 wt. %, or less than 5 wt. %, or no post consumer recycle polyester polymer ("PCR") present in the composition. In another embodiment, the composition contains PCR in an amount of greater than zero and up to 60 wt. %, or up to 40 wt. %, or up to 20 wt %, or up to 10 wt. %.

Specific examples of the phosphorus compounds mentioned above as suitable catalyst deactivators and/or stabilizers include phosphoric acid, pyrophosphoric acid, phosphorous acid, polyphosphoric acid, carboxyphosphonic acids, phosphonic acid derivatives, and each of their acidic salts and acidic esters and derivatives, including acidic phosphate esters such as phosphate mono- and di-esters and non-acidic phosphate esters (e.g. phosphate tri-esters) such as trimethyl phosphate, triethyl phosphate, tributyl phosphate, tributoxyethyl phosphate, tris(2-ethylhexyl) phosphate, oligomeric phosphate tri-esters, trioctyl phosphate, triphenyl phosphate, tritolyl phosphate, (tris)ethylene glycol phosphate, triethyl phosphonoacetate, dimethyl methyl phosphonate, tetraisopropyl methylenediphosphonate, mono-, di-, and tri-esters of phosphoric acid with ethylene glycol, diethylene glycol, or 2-ethylhexanol, or mixtures of each. Other examples include distearylpentaerythritol diphosphite, mono- and di-hydrogen phosphate compounds, phosphite compounds, certain inorganic phosphorus compounds that are preferably soluble in the polymer melt, poly(ethylene)hydrogen phosphate, silyl phosphates; phosphorus compounds used in combinations with hydroxy- or amino-substituted carboxylic acids, such as methyl salicylate, maleic acid, glycine, or dibutyl tartrate; each useful for inactivating metal catalyst residues. Haze in solutions of particles or in molded parts is one indication of lack of solubility. Soluble additives are more likely to deactivate/stabilize the catalyst system.

Other phosphorus compounds which may be added include the amine salts of phosphorus-containing acids. The amines may be cyclic or acyclic, may be monomeric, oligomeric, or polymeric, and should be selected so as to minimize haze and/or solubility when the latter are issues. The organic constituents of the amine may in principle be any organic group. Ammonia and related compounds like ammonium hydroxide are suitable.

To minimize It.V. loss if large quantities of phosphorus are added, or to further minimize the potential It.V. loss even if moderate or optimal quantities of phosphorus are added, it is desirable to add the phosphorus compound neat, that is without further dilution, such as in the case of 85% or more phosphoric acid. If a carrier is used, it is preferred that that the carrier is nonreactive, that is, does not break the polymer chain nor increase M generation rates. Water, alcohols, glycols and lower molecular weight PET are known to break the polymer chain. Once the minimum amount of the phosphorus compound and the associated It.V. loss are known, the melt-phase process can be carried out such that the It.V, made before deactivation/stabilization, is higher by the amount of It.V. loss expected so that the target ItV. can be achieved.

The melt phase reaction proceeds in a batch, semi-batch, or continuous mode. Preferably, the process of the invention is continuous.

The catalyst solution may be added after completion of esterification, or between the esterification zone and polycondensation zone, or at a point when polycondensation starts, or during prepolymerization. In one embodiment, the catalyst solution is added after 50%, or after 80%, or after 90% conversion of the esterification reaction mixture. In another embodiment, the catalyst solution is added between the esterification zone and inception of or during polycondensation or at the inception of or during prepolymerization.

In another embodiment, the catalyst solution is added at any point to upon or after completion of esterification (at least 90% conversion) up to when the It.V. of the polyester melt reaches 0.3 dL/g, or no later than when the It.V. of the melt reaches 0.2 dL/g, and more preferably to the oligomer mixture exiting the esterification zone or prior to commencing or at the start of polycondensation.

If the molar ratio of the catalyst solution is not the molar ratio of M:Al desired in the melt phase to polymerize the polyester melt, the present invention allows one the flexibility of feeding to the melt phase a stream of the stable catalyst solution of the invention while also feeding to the melt phase process a separate stream of alkaline earth metal or alkali M. In this way, one obtains the benefit of employing a stable catalyst solution having a molar ratio of M:Al ranging from 0.5:1 to 1.5:1 to minimize yellow color body formation in the polymer melt, while retaining the flexibility of increasing the molar ratio of M:Al as high as desired to increase the polycondensation rate and reduce residence time on either the same manufacturing line when a change to a different product is desired, or when one catalyst tank is used to feed at least two lines, with the second line having a separate feed of the alkaline earth metal or alkali metal. The advantage of this system allows one the flexibility to quickly change over to new products on the same line while utilizing the inventory in a catalyst feed tank from product to product, or to make a variety of polymers having differing characteristics on different lines fed by the same catalyst mix tank, with the first line fed by the catalyst solution, and the second line (or other lines) fed by the same catalyst solution in addition to the desired amount of additional alkaline earth metal or alkali metal feeds. More than one alkaline earth metal or alkali metal may be fed to a melt phase line in addition to the catalyst solution, and the alkaline earth metal or alkali metal in the separate feed may be the same or different from the alkaline earth metal or alkali metal used in the catalyst solution.

The catalyst solution of the invention can be fed at any point in the melt phase process as described above, while simultaneously feeding a separate stream of alkaline earth metal or alkali M earlier or later or at the same feed point as the catalyst solution feed point, preferably earlier or at the same point, to adjust the desired M:Al molar ratio as needed. For example, a stream of the alkaline earth metal or alkali M can be fed to the esterification zone and before 90% conversion, or before 70% conversion, or before 50% conversion, or before 40% conversion, or before 20% conversion, while the catalyst solution can be fed at a point between 90% conversion in esterification and the polycondensation zone when the It.V. of the melt is less than 0.3 dL/g. Both feeds can occur simultaneously in a continuous process for making the polyester polymer. The feed stream of alkaline earth metal or alkali metals can be the same or different alkaline earth metals or alkali metals employed in the catalyst solution. For example, M may be Li in the catalyst solution containing Al, and M may be Na or K in the split feed stream. This allows even further flexibility in using two or more different alkaline earth metal or alkali metal M in the same melt phase polymerization line or process if desired In one embodiment where the phosphorus compound is added to a melt phase polymerization process, the catalyst stabilizer is added to the polyester melt late during the course of polycondensation and before solidification. The deactivator is added to the polyester melt late in the course of the polycondensation reaction when one or more of the following conditions are satisfied or thereafter and before solidification of the polyester melt:

a) the polyester melt reaches an It.V. of at least 0.50 dL/g or b) vacuum applied to the polyester melt, if any, is released, or c) if the polyester melt is present in a melt phase polymerization process, adding the phosphorus compound within a final reactor for making the polyester polymer or between the final reactor and before a cutter for cutting the polyester melt, or d) if the polyester melt is present in a melt phase polymerization process, following at least 85% of the time for polycondensing the polyester melt; or e) the It.V. of the polyester melt is within +/−0.15 dl/g of the It.V. obtained upon solidification; or f) at a point within 20 minutes or less of solidifying the polyester melt.

In one embodiment, the deactivator is added to the polyester melt after the polyester melt obtains an It.V. of at least 0.50 dL/g, or at least 0.55 dL/g, or at least 0.60 dL/g, or at least 0.65 dL/g, or at least 0.68 dL/g, or at least 0.70 dL/g, or at least 0.72 dL/g or at least 0.76 dL/g, or at least 0.78 dL/g, and most preferably, regardless of when the deactivator is added, the resulting polymer exiting the melt phase manufacture has an It.V. of at least 0.68 dl/g.

In another embodiment, the deactivator is added to the polyester melt during or after releasing the vacuum from the polyester melt undergoing polycondensation reactions, or after bringing the pressure in a polycondensation zone or reactor to a level of 300 mm Hg or greater, or 450 mm Hg or greater, or 600 mm Hg or greater, or to atmospheric pressure or greater, and preferably before the polyester melt is solidified.

In another embodiment, the deactivator is added at a location near or at the end of a final reactor or between the final reactor and before a cutter. For example, the deactivator is added to the last polycondensation reactor at a location proximal to the outlet of the last polycondensation reactor, or to a pipe connecting directly or indirectly the last polycondensation reactor and a gear pump or extruder providing the motive force to drive the melt through a die plate for cutting wherein said pipe is directed back to or proximal to the outlet or the bottom of the last polycondensation reactor, or to a pipe inlet to the last polycondensation reactor.

In yet another embodiment, the deactivator is added to the polyester melt following at least 85%, or at least 90%, or at least 95%, or at least 98%, or about 100% of the polycondensation time. The polycondensation time is measure as the time elapsed between the start of polycondensation zone to the exit of the polyester melt from the last polycondensation reactor.

In a further embodiment, the deactivator is added to the polyester melt when the It.V. of the polyester melt is within 0.10 dL/g, or within 0.05 dl/g, or within 0.030 dL/g, or within 0.02 of the It.V. obtained upon solidification.

In yet another embodiment, the deactivator is added to the polyester melt at a point within 20 minutes, or within 10 minutes or less, or 5 minutes or less, or 3 minutes or less of solidifying the polyester melt. The solidification of the polyester melt typically occurs when the melt is forced through a die plate into a water bath and cut into pellets, or in a melt-to-mold process when the melt is injection molded into a molded article.

In yet a more preferred embodiment, each of the embodiments identified herein occurs in a continuous manufacturing process where the throughput of the melt phase process on one manufacturing line is at least 1 ton/day, or at least 50 tons/day, or at least 100 tons/day, or at least 200 tons/day, or at least 300 tons/day, or at least 400 tons/day, or at least 500 tons/day of polyester polymer in a steady state operation.

The reaction time of the melt from an It.V. of 0.40 dL/g through and up to an It.V. in the range of at least 0.68 dL/g to 0.94 dL/g is 150 minutes or less, or 120 minutes or less, or 90 minutes or less, or 50 minutes or less. The target It.V. is preferably between 0.84 and 0.94 dL/g prior to deactivation/stabilization, the vacuum applied is preferably between 0.5 and 1.0 torr, and temperature is preferably between 275° C. to 285° C.

Stabilizing or deactivating the catalyst late or near the end of a melt phase process can result in polyester particles that, in the absence of acetaldehyde (AA) scavengers, generate less AA during subsequent melt processing. With late addition of a phosphorus compound, Al/alkaline earth metal or alkali catalyst systems can produce polyester polymers with lower AA generation rates than polyester polymers made without the presence of a catalyst deactivator or polyesters made with conventional antimony catalysts that are similarly deactivated late with a phosphorus compound. With late addition of a phosphorus compound to the polyester melt catalyzed with an aluminum/alkaline earth metal or alkali system, it is now possible to obtain a polyester polymer having free AA levels and an AA generation rate low enough for use in water bottle applications without the need to add AA scavengers or other AA lowering additives. Moreover, this type of polymer having both low free AA levels and low AA generation rates without the presence of an AA lowering additive can be obtained to a high It.V. (at least 0.68 dL/g, or at least 0.70 dL/g, or at least 0.72 dL/g, or at least 0.74 dL/g, or at least 0.76 dL/g, or at least 0.80 dL/g, or at least 0.84 It.V.) in the melt phase without the necessity for polymerizing the polymer in the solid-state. Some catalyst combinations, some phosphorus levels in PET from late addition, and some water bottle specifications may necessitate a brief AA stripping treatment to lower free AA below 2 ppm prior to beginning the injection molding process.

The polyester polymer made with the catalyst solution, and the polyester polymers used to make the preforms, bottles, and other articles, have an It.V. which is preferably at least 0.68 dL/g, or at least 0.70 dL/g, or at least 0.72 dL/g, or at least 0.74 dL/g, or at least 0.76 dL/g, or at least 0.80 dL/g, or at least 0.84 It.V., obtained in the melt phase polymerization.

The polyester polymer compositions made with the composition, when partially crystallized to a degree of crystallinity of at least 20%, or at least 30%, or at least 35%, or at least 40%, have an L* of at least 70, or at least 73, or at least 76, or at least 79, and an It.V. of at least 0.70 dL/g, or at least 0.72 dL/g, or at least 0.76 dL/g obtained from the melt phase.

The particles of the invention may be directly or indirectly packaged as a bulk into shipping containers, which are then shipped to customers or distributors. It is preferred that the particles in the shipping containers are not solid state polymerized, and more preferably, their It.V. is not lower than the It.V. of the preforms or other articles made from the particles. It is desirable that the It.V. of the particles in the shipping containers is the final It.V. desired to make the preform such that the It.V. of the particles is not subsequently increased in the solid state. The shipping containers are desirably shipped to a customer for making articles from the particles.

Shipping containers are containers used for shipping over land, sea or air. Examples include railcars, semi-tractor trailer containers, Gaylord boxes, ship hulls, or any other container which is used to transport finished polyester particles to a customer. Customers are typically converter entities who convert the particles into preforms or other molded articles.

The shipping containers contain a bulk of polyester polymer particles. A bulk occupies a volume of at least 1 cubic meter, or at least 3 cubic meters, or at least 5 cubic meters, or at least 10 cubic meters, or at least 15 cubic meters. In preferred embodiments, the bulk in the shipping container occupies a volume of at least 5 cubic meters, or at least 10 cubic meters.

In one embodiment, there is provided finished polyester polymer particles having an average It.V. of at least 0.68 dL/g, or 0.70 dL/g, or 0.72 dL/g, or 0.74 dL/g, or 0.76 dL/g, obtained in a melt phase polymerization and a residual acetaldehyde level of 10 ppm or less or of 5 ppm or less; wherein said particles contain aluminum in an amount of at least 3 ppm, or at least 5 ppm, or at least 10 ppm, or at least 15 ppm, or at least 20 ppm based on the weight of the polymers, and further contain the residues of a polyhydroxyl solvent either reacted into the polyester chain, reacted as an end group on the polyester chain, or reacted on a polyester polymer by transesterification. The solvent may be reacted into the polyester chain during melt phase polymerization such that the polyester polymer contains one unit or random repeat units of the polyhydroxyl solvent residue. Preferably, the polyester particles in the shipping container also have a degree of crystallinity of at least 20%, preferably at least 30%; and the particles also contain a nonzero level of an alkaline earth metal or alkali metal, along with a nonzero level of phosphorus. The particles are desirably contained in a shipping container. Most preferably, the particles have not been solid state polymerized. By "finished" particles is meant particles that have been subjected by the particle manufacturer to all the processing conditions needed to produce a particle ready for feeding into dryer hoppers associated with a molding machine or directly to a molding machine used for converting particles into articles, without any further processing steps performed by the particle manufacturer.

Suitable articles which are formed from the polyester polymer compositions manufactured with the composition of the invention are sheets, bottle preforms, beverage bottle preforms, and blow molded bottles made therefrom.

This invention can be further illustrated by the additional examples of embodiments thereof, although it will be understood that these examples are included merely for purposes of illustration and are not intended to limit the scope of the invention.

EXAMPLES

The solutions of the invention may exhibit haziness yet constitute solutions in which no precipitation occurs. Precipitates are deemed formed when by the eye one can observe the presence of the catalyst metal particulates settled at the bottom of the vessel.

Example 1

Preparation of a 1:1 Li:Al solution in 1,5-pentanediol: A 100 mL round bottom flask was charged with 565 mg Al(O$^i$Pr)$_3$ (aluminum isopropoxide), 115 mg LiOH.H$_2$O, and 25 g 1,5-pentanediol and heated to 130° C. with stirring and a nitrogen sweep for 4 hours. The solution was clear at the end of the heating period and remained clear for greater than 35 days without agitation when held at ambient temperature and atmospheric conditions.

Example 2

Preparation of a 1:1 Li:Al solution in 1,4-butanediol: A 100 mL round bottom flask was charged with 565 mg Al(O$^i$Pr)$_3$, 115 mg LiOH.H$_2$O, and 25 g 1,4-butanediol and heated to 130° C. with stirring and a nitrogen sweep for 4 hours. The solution was clear at the end of the heating period and remained clear for greater than 35 days when held without agitation at ambient temperature and atmospheric conditions.

Example 3

Preparation of a 1:1 Li:Al solution in 1,4-butanediol: A 100 mL round bottom flask was charged with 2.83 g Al(O$^i$Pr)$_3$, 575 mg LiOH.H$_2$O, and 30 g 1,4-butanediol and heated to 130° C. with stirring and a nitrogen sweep for 4 hours. While the solution was never completely clear, ICP analysis of a filtrate indicated that the solution contained 1.1 wt % Al and 0.277 wt % Li, thus giving some indication of the capacity of 1,4-butanediol as a solvent. Although the solution never became completely clear, the insoluble portion of the system consisted of very fine particles consistent with hydrolyzed aluminum impurities. No precipitation was observed with this sample for greater than 20 days at ambient temperature and atmospheric conditions without agitation.

Example 4

Preparation of a 1:1 Li:Al solution in 1,3-propanediol: A 100 mL round bottom flask was charged with 565 mg Al(O$^i$Pr)$_3$, 115 mg LiOH.H$_2$O, and 25 g 1,3-propanediol and heated to 130° C. with stirring and a nitrogen sweep for 4 hours. The solution was clear at the end of the heating period and remained clear for 11 days at ambient temperature and atmospheric conditions without agitation. After 11 days, precipitation began to occur.

Comparative Example 5

Preparation of a 1:1 Li:Al solution in 1,2-propanediol: A 100 mL round bottom flask was charged with 565 mg Al(O$^i$Pr)$_3$, 115 mg LiOH.H$_2$O, and 25 g 1,2-propanediol and heated to 130° C. with stirring and a nitrogen sweep for 4 hours. The solution was clear at the end of the heating period, but had precipitated substantially after less than 24 hours at ambient temperature and atmospheric conditions without agitation. This polyhydroxyl compound, while having at least 3 carbon atoms, does not have at least two primary hydroxyl groups.

Comparative Example 6

Preparation of a 1:1 Li:Al solution in ethylene glycol: A 200 mL round bottom flask was charged with 2.27 g Al(O$^i$Pr)$_3$, 460 mg LiOH.H$_2$O, and 100 g ethylene glycol and heated to 150° C. with stirring and a nitrogen purge for 2 hours. A clear solution was obtained at the end of the heating period, but precipitation began to occur within 24 hours of cooling to ambient temperature at atmospheric conditions without agitation. This polyhydroxyl compound does not contain at least 3 carbon atoms.

Comparative Example 7

Preparation of a 5:1 Li:Al solution in 1,5-pentanediol: A 100 mL round bottom flask was charged with 565 mg Al(O$^i$Pr)$_3$, 575 mg LiOH.H$_2$O, and 25 g 1,5-pentanediol and heated to 130° C. with stirring and a nitrogen sweep for 4 hours. The reaction mixture never became completely clear and further precipitated overnight at ambient conditions and atmospheric conditions without agitation. While this polyhydroxyl compound had at least 3 carbon atoms and two primary hydroxyl groups, the molar ratio of Li:Al exceeded 1.5:1.

Comparative Example 8

Preparation of a 2:1 Li:Al solution in 1,4-butanediol: A 100 mL round bottom flask was charged with 565 mg Al(O$^i$Pr)$_3$, 230 mg LiOH.H$_2$O, and 25 g 1,4-butanediol and heated to 130° C. with stirring and a nitrogen sweep for 4 hours. The reaction mixture never became completely clear with significant solid particles remaining in the mixture. While this polyhydroxyl compound had at least 3 carbon atoms and two primary hydroxyl groups, the molar ratio of Li:Al exceeded 1.5:1

Comparative Example 9

Preparation of a 3:1 Li:Al solution in 1,4-butanediol: A 100 mL round bottom flask was charged with 565 mg Al(O$^i$Pr)$_3$, 345 mg LiOH.H$_2$O, and 25 g 1,4-butanediol and heated to 130° C. with stirring and a nitrogen sweep for 4 hours. The reaction mixture never became completely clear with significant solid particles remaining in the mixture. While this polyhydroxyl compound had at least 3 carbon atoms and two primary hydroxyl groups, the molar ratio of Li:Al exceeded 1.5:1.

Comparative Example 10

Preparation of a 1:1 Li:Al solution in 1,3-butanediol: A 200 mL round bottom flask was charged with 1.13 g Al(O$^i$Pr)$_3$, 230 mg LiOH.H$_2$O, and 50 g 1,3-butanediol and heated to 130° C. with stirring and a nitrogen purge for 4 hours. A clear solution was obtained, however, upon closer examination the reaction mixture appeared to have formed a gel and not a solution. This polyhydroxyl compound does not contain at least two primary hydroxyl groups.

I claim:
1. A solution comprising:
 (i) lithium,
 (ii) aluminum isopropoxide, and
 (iii) a polyhydroxyl solvent having at least 3 carbon atoms and at least two primary hydroxyl groups, the longest carbon chain being a hydrocarbon, selected from the group consisting of 1,3-propane diol, 1,4-butane diol, 1,5-pentane diol, and combinations thereof;
 wherein the aluminum isopropoxide is present in an amount of from 2.2 to 8.4 wt % based on the total weight of the solution;
 wherein the molar ratio of Li:Al ranges from 0.75:1 to less than 1.5:1, and
 wherein no precipitation is visible to the naked eye when the solution is allowed to stand still over a period of at least one week at 25° C.
2. The solution of claim 1, wherein the solution is sufficiently stable such that, if measured, no precipitation is vis- ible to the naked eye when the solution is allowed to stand still over a period of at least three (3) weeks at 25° C.

3. The solution of claim 1, wherein the solution contains at least 3000 ppm aluminum metal based on the weight of the solution.

4. The solution of claim 3, wherein the solution contains at least 5000 ppm aluminum metal based on the weight of the solution.

5. The solution of claim 4, wherein the solution contains at least 1 wt. % aluminum metal based on the weight of the solution.

6. The solution of claim 1, wherein the molar ratio Li:Al is at least 0.85:1.

7. The solution of claim 1, wherein the molar ratio Li:Al ranges from 0.75:1 to 1.3:1.

8. The solution of claim 1, wherein the molar ratio Li:Al ranges from 0.75:1 to 1.25:1.

9. The solution of claim 1, wherein the molar ratio Li:Al ranges from 0.8:1 to 1.25:1.

10. The solution of claim 1, wherein the molar ratio Li:Al ranges from 0.85:1 to 1.2:1.

11. The solution of claim 1, wherein the molar ratio Li:Al ranges from 0.9:1 to 1.15:1.

12. The solution of claim 1, wherein the molar ratio Li:Al ranges from 0.75:1 to 1.1:1.

13. The solution of claim 1, wherein the concentration of the aluminum metal is at least 3000 ppm, and the molar ratio of Li:Al ranges from 0.8:1 to 1.2:1.

14. The solution of claim 1, wherein the primary hydroxyl groups are the only end group reactive functionalities on the solvent compound.

15. The solution of claim 1, wherein the solution comprises said solvent in an amount of at least 60 wt. % based on the weight of liquids in the solution.

16. The solution of claim 1, wherein the solution comprises said solvent in an amount of at least 80 wt. % based on the weight of liquids in the solution.

17. The solution of claim 1, wherein the amount of aluminum metal in the solution is at least 3000 ppm, and the molar ratio of Li:Al ranges from 0.75:1 to 1.3:1.

18. The solution of claim 1, wherein said period is at least three (3) weeks and the molar ratio of Li:Al ranges from 0.8:1 to 1.2:1.

19. A polyester polymer composition comprising a catalyst system and a polyester polymer, at least part of said catalyst system obtained by a solution comprising
(i) lithium,
(ii) aluminum isopropoxide, and
(iii) a polyhydroxyl solvent having at least 3 carbon atoms and at least two primary hydroxyl groups, the longest carbon chain being a hydrocarbon, selected from the group consisting of 1,3-propane diol, 1,4-butane diol, 1,5-pentane diol, and combinations thereof;
wherein the molar ratio of Li:Al ranges from 0.75:1 to less than 1.5:1,
wherein the aluminum isopropoxide is present in an amount of from 2.2 to 8.4 wt % based on the total weight of the solution; and
wherein no precipitation is visible to the naked eye when the solution is allowed to stand still over a period of at least one (1) week at 25° C.

20. The polyester polymer composition of claim 19, wherein the polyester polymer comprises a polyethylene terephthalate polymer.

21. The polyester polymer composition of claim 20, wherein the concentration of aluminum metal in the solution is at least 3000 ppm.

22. The polyester polymer composition of claim 20, wherein the composition further comprises residues of phosphorus.

23. The polyester polymer composition of claim 20, wherein the molar ratio Li:Al ranges from 0.75:1 to 1.2:1.

24. The polyester polymer composition of claim 20, wherein the polyester polymer has an It.V. of at least 0.70 dL/g obtained from a melt phase polymerization process.

25. The polyester polymer composition of claim 19, wherein said polyester polymer has an It.V. of at least 0.70 dL/g obtained from a melt phase polymerization process and the molar ratio of Li:Al ranges from 0.75:1 to 1.2:1.

26. A bottle preform obtained from the polyester polymer composition of claim 19.

27. A beverage bottle obtained from the polyester polymer composition of claim 19.

* * * * *